(12) United States Patent
DeLuca et al.

(10) Patent No.: US 11,852,488 B2
(45) Date of Patent: Dec. 26, 2023

(54) MAPPING POWER SOURCE LOCATIONS FOR NAVIGATION

(71) Applicant: INTERNATIONAL BUSINESS MACHINES CORPORATION, Armonk, NY (US)

(72) Inventors: Lisa Seacat DeLuca, Baltimore, MD (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 16/660,893

(22) Filed: Oct. 23, 2019

(65) Prior Publication Data
US 2021/0123744 A1   Apr. 29, 2021

(51) Int. Cl.
*G01C 21/20*  (2006.01)
*G06F 16/29*  (2019.01)

(52) U.S. Cl.
CPC ........... *G01C 21/206* (2013.01); *G06F 16/29* (2019.01)

(58) Field of Classification Search
None
See application file for complete search history.

(56) References Cited

U.S. PATENT DOCUMENTS

| | | | |
|---|---|---|---|
| 2014/0128021 A1* | 5/2014 | Walker | H04W 68/005 455/405 |
| 2015/0181380 A1 | 6/2015 | Altman | |
| 2016/0275400 A1* | 9/2016 | Hodges | H02J 7/0013 |
| 2016/0307007 A1 | 10/2016 | Narasimha | |
| 2016/0336815 A1 | 11/2016 | Alperin | |
| 2018/0115872 A1* | 4/2018 | Bacarella | H04W 4/029 |
| 2018/0241255 A1 | 8/2018 | Leabman | |

FOREIGN PATENT DOCUMENTS

| | | |
|---|---|---|
| CN | 201639098 U | 11/2010 |
| EP | 2161808 A3 | 3/2010 |

OTHER PUBLICATIONS

IBM, "IBM Research and Carnegie Mellon Create Open Platform to Help the Blind Navigate Surroundings", News Room, News releases, Oct. 15, 2015, 2 pages.
Mell et al., "The NIST Definition of Cloud Computing", National Institute of Standards and Technology, Special Publication 800-145, Sep. 2011, 7 pages.

* cited by examiner

*Primary Examiner* — Ig T An
*Assistant Examiner* — Mahmoud M Kazimi
(74) *Attorney, Agent, or Firm* — Rakesh Roy

(57) ABSTRACT

A method, computer system, and a computer program product for activity-based mapping and navigation is provided. The present invention may include receiving a number of reports indicating a tethered device charging event in proximity of a particular location in a venue. The present invention may further include, in response to the received number of reports satisfying a threshold number of reports, determining that the particular location includes at least one power source.

16 Claims, 9 Drawing Sheets

MAPPING POWER SOURCE LOCATIONS FOR NAVIGATION

BACKGROUND

The present invention relates generally to the field of computing, and more particularly to location-aware technologies.

Users today rely heavily on portable electronic devices (e.g., mobile devices) for communication, data processing, entertainment, and other computing needs. These mobile devices include increasingly sophisticated functionalities powered by small rechargeable batteries. When these mobile devices start running low on power, some of the functionalities may be reduced to conserve the remaining power until the mobile device is recharged. If the mobile device is being used in a public place (e.g., airport), the user may experience difficulty locating a power source to recharge the battery in order to return the mobile device to a state where all the functionalities are available to be performed by the mobile device.

SUMMARY

Embodiments of the present invention disclose a method, computer system, and a computer program product for activity-based mapping and navigation. The present invention may include receiving a number of reports indicating a tethered device charging event in proximity of a particular location in a venue. The present invention may further include, in response to the received number of reports satisfying a threshold number of reports, determining that the particular location includes at least one power source.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
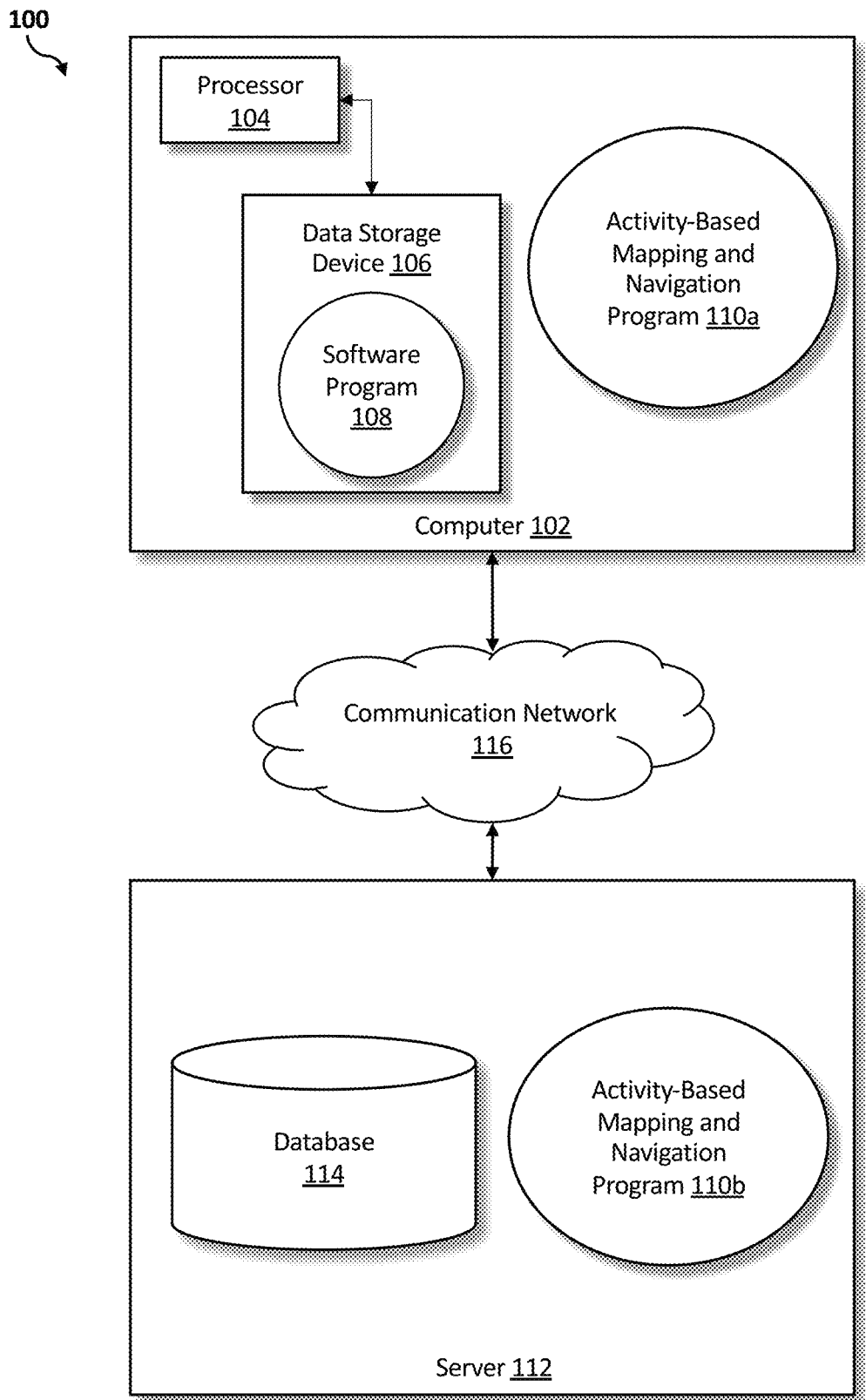
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for optimizing venue resource usage. As such, the present embodiment has the capacity to improve location-aware technologies by predicting the location and availability of resources (e.g., electrical outlets, power sources) in a venue for mapping and navigation. More specifically, an activity-based mapping and navigation program may gather one or more device data indicating that a user device is currently being charged. Then, if the activity-based mapping and navigation program determines that the user device is stationary or moving minimally relative to a location of the user device, the activity-based mapping and navigation program may predict that the location of the user device includes a power source. Thereafter, the activity-based mapping and navigation program may add the location of the power source into a navigational tool for indoor navigation.

As described previously, users today rely heavily on portable electronic devices (e.g., mobile devices) for communication, data processing, entertainment, and other computing needs. These devices include increasingly sophisticated functionalities powered by small rechargeable batteries. When these devices start running low on power, some of device functionalities may be reduced to conserve the remaining power until the device is recharged. If the device is being used in a public space (e.g., airport), the user may experience difficulty locating a power source to recharge the battery in order to return the mobile device to a state where all the functionalities are available to be performed by the mobile device.

Therefore, it may be advantageous to, among other things, provide a way to locate and map power sources in a venue to enable real-time navigational directions to available power sources within the venue.

According to at least one embodiment, once a user enters a venue, the user may opt-in to share one or more user device data with an activity-based mapping and navigation program in exchange for venue-specific information (e.g., navigational directions, power source locations). For instance, a venue such as, an airport, may include a website or application, which may provide a feature to enable the user to opt-in (e.g., grant access) to share one or more device data with the activity-based mapping and navigation program. In one embodiment, the device data transmitted to the activity-based mapping and navigation program may include, for example, data associated with the percentage of power remaining in the user device, data associated with the power level of the user device, data associated with an accelerometer sensor in the user device (e.g., to determine if the user carrying the user device is moving), data associated with the indoor positioning of the user device (e.g., via Bluetooth® (Bluetooth and all Bluetooth-based trademarks and logos are trademarks or registered trademarks of Bluetooth SIG, Inc. and/or its affiliates) beacons, Global Positioning System (GPS) coordinates, Wi-Fi triangulation, cameras), and data associated with changes in the power level of the user device (e.g., actively depleting, actively increasing).

According to one embodiment, the activity-based mapping and navigation program may determine if the user device is currently being charged based on the data associated with changes in the power level of the user device. If the user device is being charged, the activity-based mapping and navigation program may determine the movement of the user. If the user device is moving, the activity-based mapping and navigation program may ignore the charging indication as the user device is likely being charged using an alternative power source such as, a portable power bank. However, if the user device is determined as not moving or moving minimally relative to a location of the user device, the activity-based mapping and navigation program may determine the location of the user device. Thereafter, the activity-based mapping and navigation program may assign a probability score associated with the likelihood of the determined location including a power source. In one embodiment, the activity-based mapping and navigation program may determine whether additional user devices provide similar charging indications in the same location. The activity-based mapping and navigation program may increase a confidence score of the location having a power source with each new report exhibiting similar user device patterns. According to one embodiment, if the activity-based mapping and navigation program determines that a device is not being charged, the activity-based mapping and navigation program may wait until the device is being charged, to repeat the power source mapping.

According to at least one embodiment, once the threshold number of reports is met, the activity-based mapping and navigation program may add the location to a data lake of available power sources for indoor navigational purposes. In one embodiment, the activity-based mapping and navigation program may calculate, based on crowd sourced data, an expected battery charge time for a corresponding device (e.g., smart phone with 20% power remaining may need to charge for 20 minutes at a power source location to be fully charged). In one embodiment, the activity-based mapping and navigation program may calculate, based on crowd sourced data, an expected battery depletion time for a corresponding device (e.g., smart phone with 20% power remaining may need to be recharged within 30 minutes).

According to at least one embodiment, the activity-based mapping and navigation program may also calculate a power source occupancy at a determined power source location. For instance, if at a given time, the activity-based mapping and navigation program determines that a maximum of four devices show increasing power in a similar location, the activity-based mapping and navigation program may determine that the location includes four possible power sources. In another embodiment, the activity-based mapping and navigation program may facilitate an indoor navigational tool to the current availability of power sources at a given location. For instance, if the activity-based mapping and navigation program determines that a given power source location is not indicating power usage, the activity-based mapping and navigation program may suggest that the power source is available. In another embodiment, once a power source is mapped, availability may be indicated by the non-active moving of devices in proximity of the power source (e.g., in instances where the users have not opted into sharing device data).

According to at least one embodiment, the activity-based mapping and navigation program may generate a visual representation of the location of the power sources in a public area of the venue. The activity-based mapping and navigation program may render the visual representation on a display which may either be shared publicly in the venue or retrievable from the user device (e.g., smart phone).

According to one embodiment, if the activity-based mapping and navigation program does not receive reports of the location including a power source for a set period of time, the activity-based mapping and navigation program may: mark that location as no longer active, send a request to a service technician to perform maintenance at the location, and/or remove the location from the indoor navigation database.

According to one embodiment, if the activity-based mapping and navigation program determines that a device is running low on power, the activity-based mapping and navigation program may trigger a power source real-time data in comparison with the location of the device to provide navigational directions to an available power source. In one embodiment, the activity-based mapping and navigation program may transmit an alert to nearby devices that may be using the power source, despite the device being fully charged, to make the power source available for the device running low on power.

According to one embodiment, if the activity-based mapping and navigation program navigates a device to a power source and determines that the device is not being charged, the activity-based mapping and navigation program may read the IoT sensor data from the device to predict an incorrect power source information. In another embodiment, the activity-based mapping and navigation program may enable the device to provide feedback indicating that the power source is not at the predicted location, the power source is not functioning, and/or the power source could not be located.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an activity-based mapping and navigation program 110a. The networked computer environment 100 may also include a server 112 that is enabled to run an activity-based mapping and navigation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116.

The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the activity-based mapping and navigation program 110a, 110b may interact with a database 114 that may be embedded in various storage devices, such as, but not limited to a computer/mobile device 102, a networked server 112, or a cloud storage service.

Figure 2:
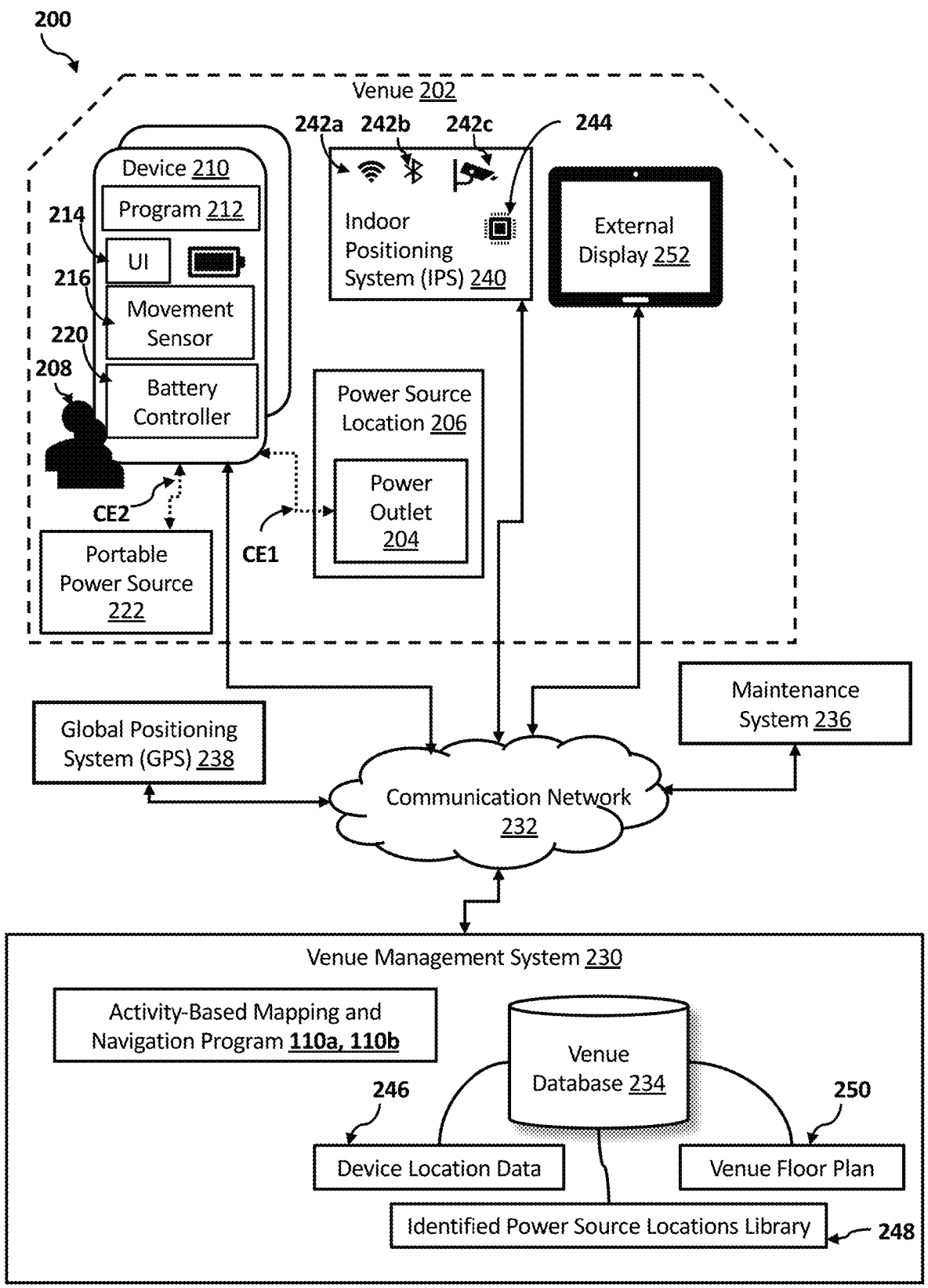
FIG. 2 is a block diagram of a facility optimization system according to at least one embodiment.

Referring now to FIG. 2, a block diagram illustrating a facility optimization system 200 according to at least one embodiment is depicted.

According to one embodiment, the facility optimization system 200 may be deployed in association with a venue 202, which may include, an indoor space, an outdoor space, or a hybrid space (e.g., semi-indoor, semi-outdoor). Examples of venue 202 may include, without limitations, a building, a shopping complex, an airport, a stadium, or any other indoor/outdoor/hybrid environment where people may occupy and move through various locations of the environment.

According to one embodiment, the venue 202 may be equipped with features and assets, the locations of which may initially be unknown to venue stakeholders and occupants. For example, the venue 202 may include an electrical infrastructure with many power outlets installed throughout the venue 202. It may be advantageous to catalog the previously-unknown locations of the power outlets in order to the optimize the utilization and maintenance of the power outlets in the venue 202. Thus, the facility optimization system 200 may be provided in the networked computer environment 100 and implement one or more client computers 102 and/or one or more server computers 112 running an activity-based mapping and navigation program 110a, 110b to identify and map, for indoor navigational purposes, one or more power outlets 204 included in corresponding power source locations 206 within the venue 202.

According to one embodiment, the facility optimization system 200 may include one or more users 208 interacting with respective electronic devices 210 while in the venue 202. Device 210 may include a battery-powered device such as, for example, a mobile device, a telephone, a personal digital assistant, a netbook, a laptop computer, a tablet computer, or any type of computing device. In at least one embodiment, the device 210 may include various applications and programs 212 such as, for example, an instance of the activity-based mapping and navigation program 110a, 110b and/or other venue-specific applications (e.g., a conference event mobile application) as will be further detailed below. The device may also include a user interface (UI) 214, a movement sensor 216 (e.g., multi-axis accelerometer), a rechargeable battery 218, and a battery controller 220.

According to one embodiment, the UI 214 may include a web interface or a graphical user interface (GUI) configured to display (e.g., output) graphical or textual data from the program 212 running on the device 210. In one embodiment, the UI 214 may also provide an input device to enable the user 208 to interact with the program 212 (e.g., to select user options) running on the device 210. For instance, the activity-based mapping and navigation program 110a, 110b may provide a user preferences page via the UI 214 of the device 210 to enable the user 208 to opt-in or opt-out of sharing device data with the activity-based mapping and navigation program 110a, 110b.

According to one embodiment, the battery controller 220 may monitor and control the rechargeable battery 218 powering the device 210. In one embodiment, the battery controller 220 may provide data associated with the battery 218 (e.g., power data, charging event data, low power data) to the activity-based mapping and navigation program 110a, 110b and may enable recharging of the battery 218 via electrical input from the power outlet 204 and/or a portable power source 222 (e.g., external battery pack). In one embodiment, the activity-based mapping and navigation program 110a, 110b may identify electrical input from the power outlet 204 to the device 210 as a tethered device charging event CE1 and may identify electrical input from the portable power source 222 to the device 210 as an untethered device charging event CE2, as will be further described with reference to FIGS. 3-6.

According to one embodiment, the facility optimization system 200 may further include a venue management system 230 in communication with the devices 210 via a communication network 232. In one embodiment, the venue management system 230 may utilize a server computer (e.g., server 112) or any suitable computing system running an instance of the activity-based mapping and navigation program 110a, 110b. In at least one embodiment, the venue management system 230 may provide the activity-based mapping and navigation program 110a, 110b as a service which the device 210 may access and implement via the communication network 232. In some embodiments, the venue management system 230 may include a venue database 234. In other embodiments, the venue database 234 may be provided as a separate entity interconnected with the venue management system 230 via communication network 232.

According to one embodiment, the facility optimization system 200 may also include a maintenance system 236, a global positioning system (GPS) 238, and an indoor positioning system (IPS) 240 interconnected via communication network 232. In one embodiment, the venue management system 230 may communicate with the maintenance system 236 to request a service technician for repairs and maintenance of assets (e.g., power outlets 204) in the venue 202.

In one embodiment, the IPS 240 may be incorporated within the venue 202 to detect the device 210, and thereby the respective user 208 of the device 210, in various locations throughout the venue 202. Specifically, the IPS 240 may include one or more position detecting sensors configured to calculate a current location of the device 210 within the venue 202. In at least one embodiment, the position detecting sensors may include, one or more Wi-Fi triangulation sensors (e.g., Wi-Fi sensor) 242a, one or more Bluetooth Low Energy (BLE) beacons 242b, and one or more video monitoring sensors (e.g., video camera) 242c installed in various zones (e.g., regions and areas) throughout the venue 202. In one implementation, the device 210 may detect and measure a signal strength broadcasted from the Wi-Fi sensor 242a and/or the BLE beacon 242b. The device 210 may then transmit the measured signal strength to an IPS processor 244, which may use the measured signal strength to calculate a distance from the device 210 to the Wi-Fi sensor 242a and/or the BLE beacon 242b and thereby determine a current location of the device 210. In at least one embodiment, the video camera 242c may also enable the IPS 240 to identify the location of the user 208 in the venue 202. In one embodiment, the current location of the device 210 may be stored and updated (e.g., periodically) in the venue database 234 as device location data 246. In some instances, such as, for example, if the venue 202 includes outdoor space, global positioning data (e.g., from GPS 238) associated with the device 210 may be combined with device location data from the IPS 240 to determine the current location of the device 210. In some instances, the GPS 238 may be used to determine when devices 210 enter and exit the venue 202 (e.g., a geo-fence may be defined around a perimeter of the venue 202).

According to one embodiment, when the user 208 enters the venue 202, the activity-based mapping and navigation program 110a, 110b may prompt (e.g., via UI 214) the user 208 to share device data with the activity-based mapping and navigation program 110a, 110b in exchange for venue-specific navigational guidance and information on venue-specific features and assets. If the user 208 opts-in to sharing device data, the activity-based mapping and navigation program 110a, 110b may use the shared device data to identify and map the power source locations 206 in the venue 202. In at least some embodiments, the activity-based mapping and navigation program 110a, 110b may use the mapped power source locations to provide navigational directions to the users 208 (e.g., via device 210) to the closest power source locations 206 with available power outlets 204.

In one embodiment, the activity-based mapping and navigation program 110a, 110b may analyze data received from the device 210 to determine whether the device 210 is being charged via the power outlet 204 (e.g., tethered charging event CE1) or via the portable power source 222 (e.g., untethered charging event CE2). In one embodiment, the activity-based mapping and navigation program 110a, 110b may determine, based on movement data from the movement sensor 216, whether the user 208 is stationary or actively moving through the venue 202. In one embodiment, stationary may include the user 208 dwelling in a particular location of the venue 202 or moving minimally with reference to a particular location in the venue 202. If the activity-based mapping and navigation program 110a, 110b determines that the device 210 is being charged and the user 208 is moving, the activity-based mapping and navigation program 110a, 110b may determine that the device 210 is being charged via the portable power source 222 (e.g., untethered charging event CE2) and may ignore the device charging event. If the activity-based mapping and navigation program 110a, 110b determines that the device 210 is being charged and the user 208 is stationary (or moving minimally), the activity-based mapping and navigation program 110a, 110b may determine that the device 210 is being charged via the power outlet 204 (e.g., tethered charging event CE1). Then, the activity-based mapping and navigation program 110a, 110b may identify the power source location 206 of the power outlet 204 (e.g., via location data from the IPS 240) and add the power source location 206 to an identified power source locations library 248 in the venue database 234. In one embodiment, the venue database 234 may include a venue floor plan 250. After identifying the power source location 206, the activity-based mapping and navigation program 110a, 110b may digitally mark the venue floor plan 250 with the power source locations 206 to enable the users 208 to visualize the power source locations 206 in the context of the venue floor plan 250. In at least one embodiment, the activity-based mapping and navigation program 110a, 110b may provide navigational directions to available power source locations 206 closest to the current location of the users 208. According to another embodiment, the venue 202 may include an external display 252 (e.g., digital display in a public area). In some instances, the activity-based mapping and navigation program 110a, 110b may render, on the external display 252, a visual representation of the power source locations 206 superimposed with the venue floor plan 250.

Figure 3:
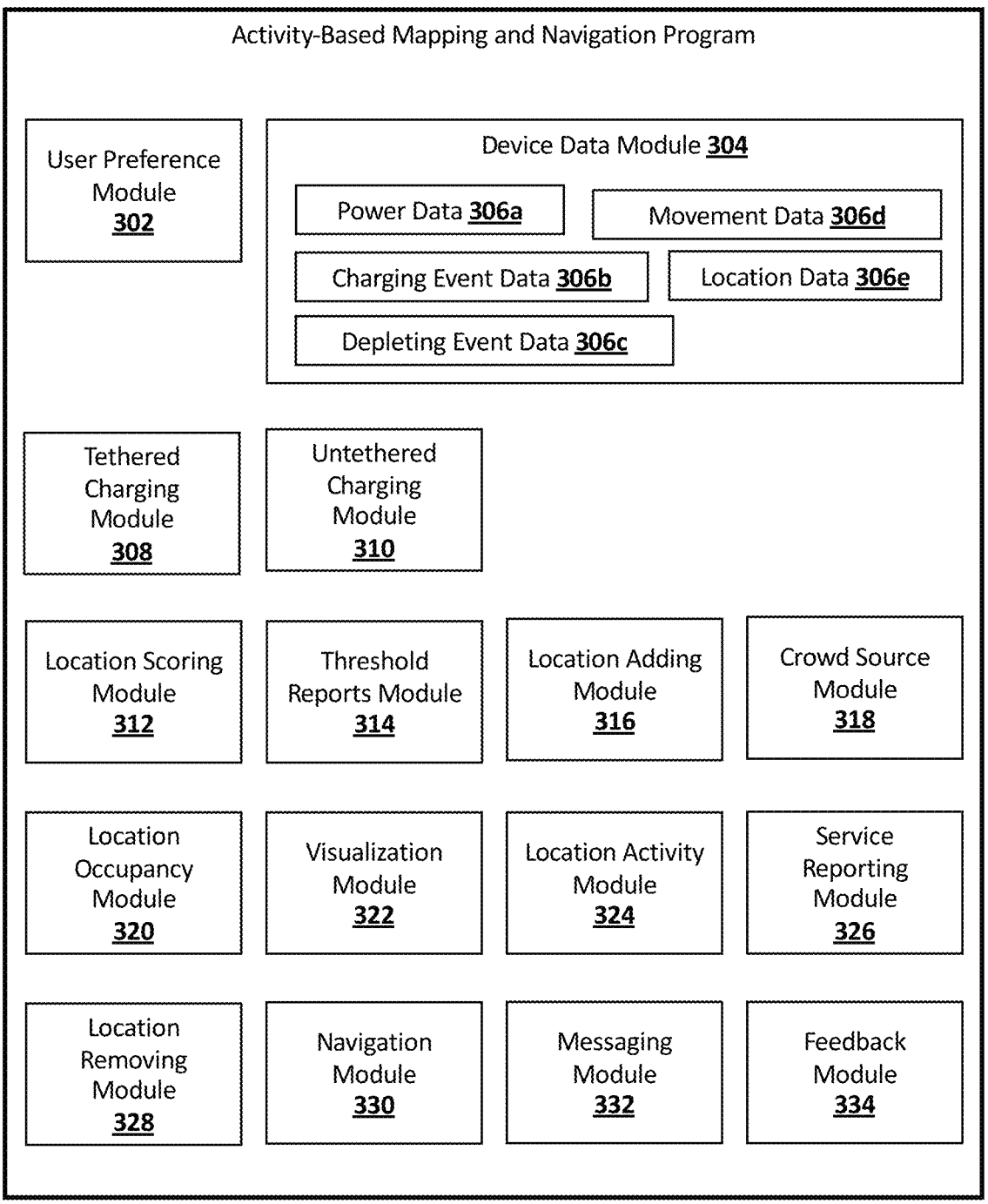
FIG. 3 is a block diagram illustrating components of an activity-based mapping and navigation program implemented in the facility optimization system depicted in FIG. 2, according to at least one embodiment.

Referring now to FIG. 3, a block diagram 300 illustrating components of the activity-based mapping and navigation program 110a, 110b according to at least one embodiment is depicted.

According to one embodiment, the activity-based mapping and navigation program 110a, 110b, may be implemented on one or more client computers 102 and/or one or more server computers 112. In one embodiment, the activity-based mapping and navigation program 110a, 110b may include a single computer program or multiple program modules or sets of instructions being executed by the processor of the client computer 102/server computer 112. The activity-based mapping and navigation program 110a, 110b may include routines, objects, components, units, logic, data structures, and actions that may perform particular tasks or implement particular abstract data types. The activity-based mapping and navigation program 110a, 110b may be practiced in distributed cloud computing environments where tasks are performed by remote processing devices that may be linked through a communication network (e.g., communication network 116, communication network 232).

According to one embodiment, the activity-based mapping and navigation program 110a, 110b may include a user preference module 302. In one embodiment, the user preference module 302 may enable a user (e.g., user 208) of a device (e.g., device 210) to interact with a device UI (e.g., UI 214) to opt-in or opt-out of sharing one or more device data with the activity-based mapping and navigation program 110a, 110b. In one instance, the user may interact with a web interface or application interface of a venue (e.g., venue 202) to indicate whether the user would like to share (e.g., grant access to) device data with the activity-based mapping and navigation program 110a, 110b. In one embodiment, the activity-based mapping and navigation program 110a, 110b may indicate, via the device UI, that sharing device data may enable to activity-based mapping and navigation program 110a, 110b to provide the user with venue navigational assistance and directions to available power outlets (e.g., power outlet 204) with the venue.

According to one embodiment, the activity-based mapping and navigation program 110a, 110b may include a device data module 304. If the user opts-in to sharing data with the activity-based mapping and navigation program 110a, 110b, the device data module 304 may enable the activity-based mapping and navigation program 110a, 110b to collect and receive various device data. In one embodiment, the activity-based mapping and navigation program 110a, 110b may receive a power data 306a, a charging event data 306b, a depleting event data 306c, a movement data 306d, and a location data 306e. The power data 306a may be provided by a battery controller (e.g., battery controller 220)

of the device and may indicate a battery power level and/or the percentage of battery power remaining in the device. In one embodiment, the device data module 304 may also gather data associated to changes in the power level of the device. For instance, the activity-based mapping and navigation program 110a, 110b may receive a charging event data 306b from the battery controller indicating that the battery of the device is actively being charged via an electrical power input (e.g., from power outlet or portable power source). The activity-based mapping and navigation program 110a, 110b may also receive a depleting event data 306c (e.g., low power indication) from the battery controller indicating that the battery of the device is actively being depleted. In one embodiment, the activity-based mapping and navigation program 110a, 110b may receive the movement data 306d from a movement sensor (e.g., accelerometer, movement sensor 216) to determine whether the user carrying the device is stationary or moving. In one embodiment, the activity-based mapping and navigation program 110a, 110b may receive a location data 306e indicating a current location of the device in the venue. In one embodiment, an indoor positioning system (e.g., IPS 240) may communicate with the device and store the device location (e.g., device location data 246) in a database associated with the venue (e.g., venue database 234).

According to one embodiment, the activity-based mapping and navigation program 110a, 110b may include a tethered charging module 308. In one embodiment, the tethered charging module 308 may be implemented if the charging event data 306b and the movement data 306d indicates that the device is being charged and the device is stationary or moving minimally (e.g., range of movement limited by length of charging cable; within 0-3 feet) relative to a particular location in the venue. In one embodiment, the tethered charging module 308 may indicate that the device is charging and tethered, e.g., via the charging cable, to a power outlet in the venue. In one embodiment, the tethered charging module 308 may activate a first routine where the location data 306e may be gathered to determine a potential power source location within the venue.

According to one embodiment, the activity-based mapping and navigation program 110a, 110b may include an untethered charging module 310. In one embodiment, the untethered charging module 310 may be implemented if the charging event data 306b and the movement data 306d indicates that the device is being charged and the device is moving actively through the venue. In such instances, the charging event data 306b may be associated with the device charging using an alternative power source (e.g., external battery pack, power bank). Since the charging event data 306b may not be associated with the location of a power outlet in the venue, the untethered charging module 310 may activate a second routine where the charging event data 306b may be ignored.

According to one embodiment, the activity-based mapping and navigation program 110a, 110b may include a location scoring module 312. In one embodiment, the location scoring module 312 may assign a probability score associated with a location in a venue being a charging station or power source location (e.g., power source location 206). In one embodiment, the location scoring module 308 may be implemented by the tethered charging module 308. That is, if the charging event data 306b and the movement data 306d indicates that the device is being charged and the device is stationary or moving relative to a particular location in the venue, the tethered charging module 308 may activate the first routine to determine the potential power source location within the venue and implement the location scoring module 312 as described above. With each tethered charging indication or report (e.g., by the tethered charging module 308) associated with a particular location within the venue, the location scoring module 312 may increase a confidence score of the particular location being a power source location.

According to one embodiment, the activity-based mapping and navigation program 110a, 110b may include a threshold reports module 314. In one embodiment, the activity-based mapping and navigation program 110a, 110b may determine whether additional devices exhibit similar battery charging patterns (e.g., based on charging event data 306b and movement data 306d) in a same or similar location of the venue. In one embodiment, the activity-based mapping and navigation program 110a, 110b may receive a number of reports indicating tethered device charging in proximity of a particular location (e.g., same or similar location) in the venue. The threshold reports module 314 may count the received number of reports indicating tethered device charging in proximity of the particular location and determine if the received number of reports satisfies (e.g., meets or exceeds) a threshold number of reports. In one embodiment, the threshold number of reports may include a default boundary value that may be pre-established by the threshold reports module 314. In one embodiment, the threshold reports module 314 may provide an option for an administrator of the venue management system running the activity-based mapping and navigation program 110a, 110b to set and modify (e.g., via the UI) a user-defined boundary value for the threshold number of reports.

According to one embodiment, the threshold number of reports may be satisfied by receiving one report indicating tethered device charging in proximity of a particular location in the venue. In another embodiment, the threshold number of reports may be satisfied by receiving multiple reports from a single device indicating multiple tethered device charging events in proximity of the particular location in the venue (e.g., a single device returning to the same location multiple times for device charging). In at least one embodiment, the threshold number of reports may be satisfied by receiving multiple reports from multiple devices indicating corresponding tethered device charging events in proximity of the particular location in the venue (e.g., multiple devices returning to the same location for device charging).

After the count of the received number of reports satisfies the threshold number of reports, the threshold reports module 314 may be triggered to determine that the particular location in the venue is a power source location including at least one power outlet.

According to one embodiment, the activity-based mapping and navigation program 110a, 110b may include a location adding module 316. In one embodiment, the threshold reports module 314 may activate the location adding module 316 to add the identified power source location to a data lake of available power sources (e.g., identified power source locations library 248 in venue database 234). In one embodiment, the activity-based mapping and navigation program 110a, 110b may incorporate the identified power source locations as a data layer in a map or floor plan (e.g., venue floor plan 250) of the venue to enable users to navigate to the power source locations within the venue.

According to one embodiment, the activity-based mapping and navigation program 110a, 110b may include a crowd source module 318. In one embodiment, the crowd source module 318 may be implemented to determine, based on aggregating device data from multiple devices, an expected battery charging time (e.g., battery recharging rate) for a corresponding device including a corresponding power level. In one embodiment, the crowd source module 318 may store historical battery recharging rate data from devices including various models and manufacturers. Thus, the crowd source module 318 may provide a user with the battery recharging rate data corresponding to the particular device (e.g., model and/or manufacturer) associated with the user. In one embodiment, the crowd source module 318 may also use the battery recharging rate data to calculate when an occupied power source location may become available.

According to one embodiment, the activity-based mapping and navigation program 110a, 110b may include a location occupancy module 320. In one embodiment, the location occupancy module 320 may determine a number of power outlets (e.g., power outlet 204) included in a power source location (e.g., power source location 206) based on counting a maximum number of devices (a given time) indicating increasing power in a similar location of the venue. In one embodiment, the location occupancy module 320 may also communicate that an identified power outlet may be available for charging a device based on determining that another device is not currently using power from the identified power outlet. In another embodiment, the availability of the identified power outlet may be determined based on the non-active movement of devices in proximity of the identified power outlet. This embodiment may be provided when devices have opted-out from sharing device data.

According to one embodiment, the activity-based mapping and navigation program 110a, 110b may include a visualization module 322. In one embodiment, the visualization module 322 may generate a visual representation (e.g., digital icon) of the identified power source locations on a floor plan (e.g., venue floor plan 250) or map associated with the venue. In one embodiment, the activity-based mapping and navigation program 110a, 110b may transmit a visual representation of the mapped power source locations to the device of the user. In at least one embodiment, the activity-based mapping and navigation program 110a, 110b may also transmit the visual representation of the mapped power source locations to a display (e.g., external display 252) in a public area of the venue. In one embodiment, the visual representation of the mapped power source locations may indicate the power outlets that may be currently available and/or current occupied. In one embodiment, the visual representation of the mapped power source locations may indicate an expected wait time for an available power outlet based on the expected battery charging rates of the devices currently being charged at the corresponding power outlets.

According to one embodiment, the activity-based mapping and navigation program 110a, 110b may include a location activity module 324. In one embodiment, the location activity module 324 may monitor a power usage activity of the identified power source locations. If no reports of power usage activity are received for a set period of time (e.g., predefined by the activity-based mapping and navigation program 110a, 110b), the location activity module 324 may mark the power source location (e.g., in the visual representation of the mapped power source locations) as inactive. In another embodiment, if no reports of power usage activity are received for the set period of time, the location activity module 324 may implement a service reporting module 326 of the activity-based mapping and navigation program 110a, 110b. The service reporting module 326 may communicate with a repair and maintenance system (e.g., maintenance system 236) associated with the venue to request that a service technician be sent to the inactive power source location. In another embodiment, if no reports of power usage activity are received for the set period of time, the location activity module 324 may implement a location removing module 328 of the activity-based mapping and navigation program 110a, 110b. In one embodiment, the location removing module 328 may remove the inactive power source location from the identified power source locations library stored in the venue database.

According to one embodiment, the activity-based mapping and navigation program 110a, 110b may include a navigation module 330. In one embodiment, if the activity-based mapping and navigation program 110a, 110b receives a low power indication (e.g., depleting event data 306c) from a device, the activity-based mapping and navigation program 110a, 110b may execute the navigation module 330 to provide navigational directions to available power outlets. In one embodiment, the navigation module 330 may compare the location data 306e of the device with the identified power source locations library to determine the power source locations closest to the user including available power outlets. In one embodiment, the navigation module 330 may interface with an indoor navigational tool to communicate the navigational directions via the UI of the device.

According to one embodiment, the activity-based mapping and navigation program 110a, 110b may include a messaging module 332. The messaging module 332 may operate to generate messages for devices that may be fully charged and still occupying nearby power outlets. In one embodiment, the message generated by the messaging module 332 may request the charged device to make the power outlet available for the device indicating low power. In at least one embodiment, the messaging module 332 may work with the location occupancy module 320 to determine the occupancy of nearby power outlets.

According to one embodiment, the activity-based mapping and navigation program 110a, 110b may include a feedback module 334. In one embodiment, the feedback module 334 may determine based on feedback data, whether an identified power source location is accurate and functioning properly. In one embodiment, if the activity-based mapping and navigation program 110a, 110b navigates the user to an identified power source location and determines, based on the power data 306a and/or the charging event data 306b, that the device of the user is not being charged, the feedback module 334 may determine that the identified power source location may be incorrect. In another embodiment, the feedback module 334 may enable the user to provide feedback via the UI of the device. In one embodiment, the user may provide feedback indicating that the power source location could not be found, the power source location does not exist, and/or the power outlet is not functioning.

According to the present embodiment, a user using a client computer 102 or a server computer 112 may use the activity-based mapping and navigation program 110a, 110b or the activity-based mapping and navigation program 110a, 110b to map and navigate to power source locations in a venue. The activity-based mapping and navigation method is explained in more detail below with respect to FIGS. 4 and 5.

According to one embodiment, the activity-based mapping and navigation program may generally include receiving a threshold number of reports indicating a tethered device charging event in proximity of a particular location in a venue. In response to receiving the threshold number of reports, the activity-based mapping and navigation program may also include determining that the particular location in the venue includes at least one power outlet.

Figure 4:
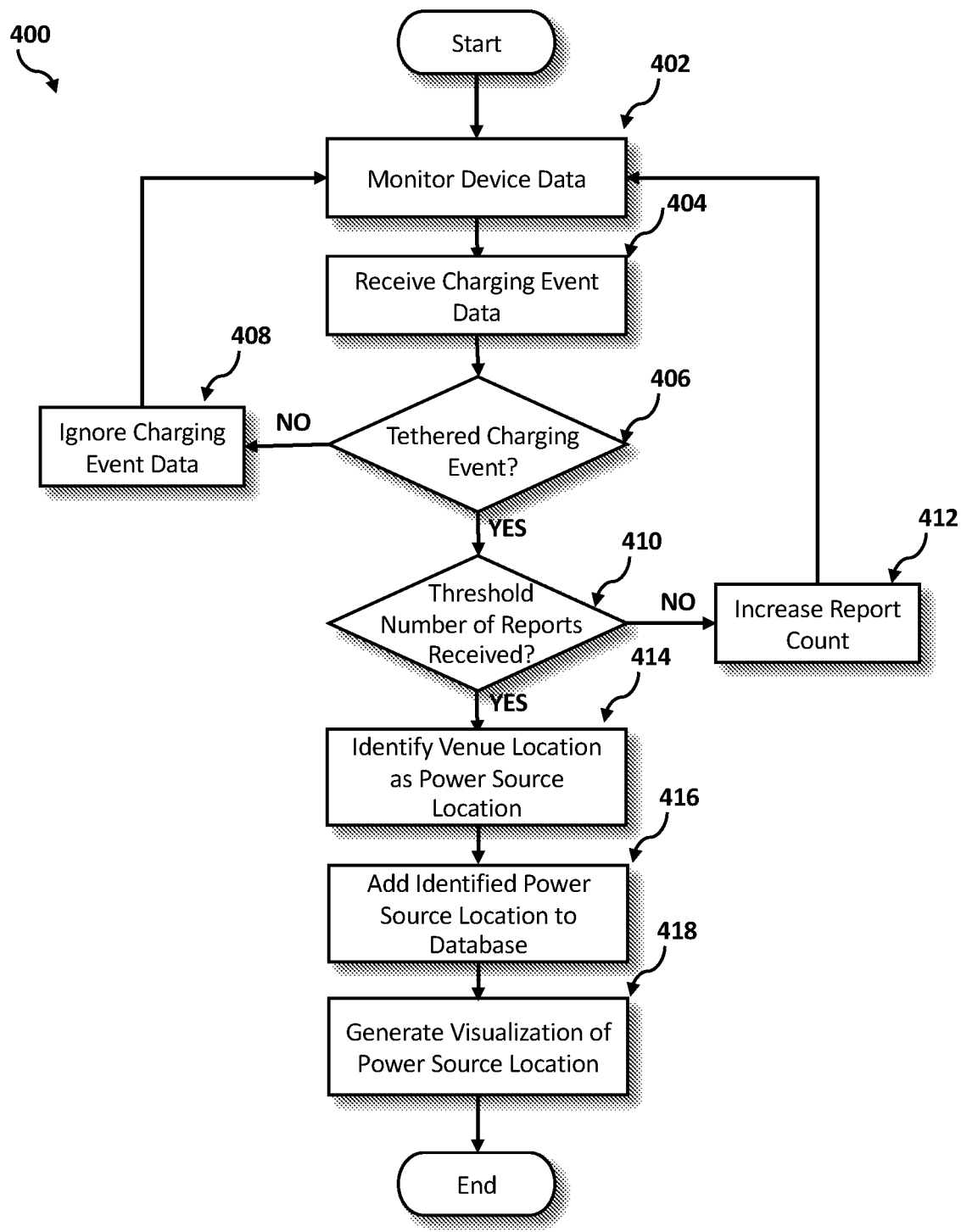
FIG. 4 is an operational flowchart illustrating a mapping process of the activity-based mapping and navigation program according to at least one embodiment.

Referring now to FIG. 4, an operational flowchart illustrating the exemplary mapping process 400 used by the activity-based mapping and navigation program 110a, 110b according to at least one embodiment is depicted.

At 402, device data is monitored. The activity-based mapping and navigation program 110a, 110b may gain access to device data if the user opts-in to sharing the device data after entering a venue associated with the activity-based mapping and navigation program 110a, 110b. According to one embodiment, the activity-based mapping and navigation program 110a, 110b may enable the user of a device to interact with a device UI to opt-in or opt-out of sharing one or more device data with the activity-based mapping and navigation program 110a, 110b, as described previously. If the user opts-in to sharing the device data, the activity-based mapping and navigation program 110a, 110b may gain access to and monitor data such as, power data, battery charging event data, battery depleting event data, movement data, and location data.

Then at 404, charging event data is received. According to one embodiment, the activity-based mapping and navigation program 110a, 110b may receive a charging event data from the battery controller indicating that the battery of the device is actively being charged via an electrical power input (e.g., from power outlet or portable power source), as described previously.

Then at 406, the activity-based mapping and navigation program 110a, 110b determines if the charging event data indicates a tethered charging event. According to one embodiment, the activity-based mapping and navigation program 110a, 110b may determine a tethered charging event if the charging event data and the movement data received from the device indicates that the device is being charged and the device is stationary or moving minimally relative to a particular location in the venue. For instance, if the device is charging and tethered, e.g., via the charging cable, to a power outlet in the venue, the tethered charging event may be determined. In one embodiment, the tethered charging module 308 may activate a first routine where the location data 306e may be gathered to determine a potential power source location within the venue.

If the activity-based mapping and navigation program 110a, 110b determines that the charging event data does not indicate a tethered charging event at 406, then at 408, the activity-based mapping and navigation program 110a, 110b ignores the charging event data. In one embodiment, if the charging event data and the movement data indicates that the device is being charged and the device is moving actively through the venue such that the device may not be tethered to the power outlet, the activity-based mapping and navigation program 110a, 110b may determine that the device is being charged via an alternative power source. In one embodiment, the activity-based mapping and navigation program 110a, 110b may ignore the charging event data as an untethered charging event and return to monitoring device data at 402.

However, if the activity-based mapping and navigation program 110a, 110b determines that the charging event data indicates the tethered charging event at 406, then at 410, the activity-based mapping and navigation program 110a, 110b determines if a threshold number of reports indicating the tethered charging event has been received. In one embodiment, the activity-based mapping and navigation program 110a, 110b may retrieve the location data associated with the tethered charging event to determine a potential power source location within the venue, as described previously. Then, the activity-based mapping and navigation program 110a, 110b may determine whether additional devices exhibited similar battery charging patterns in a same or similar location of the venue.

As previously described, the threshold number of reports may include a default boundary value or a user-defined boundary value. In one embodiment, the activity-based mapping and navigation program 110a, 110b may count the received number of reports to determine if the count satisfies the threshold number of reports. In one instance, the threshold number of reports may be satisfied by receiving a single report from a single device indicating tethered device charging in proximity of a particular location in the venue. In another instance, the threshold number of reports may be satisfied by receiving multiple reports from the single device indicating multiple tethered device charging events in proximity of the particular location in the venue. In some instances, the threshold number of reports may be satisfied by receiving multiple reports from multiple different devices indicating corresponding tethered device charging events in proximity of the particular location in the venue.

If at 410, the activity-based mapping and navigation program 110a, 110b determines that the threshold number of reports have not been received (e.g., a report count does not satisfy the threshold number of reports), then at 412, the activity-based mapping and navigation program 110a, 110b increases the report count and returns to monitoring device data at 402. According to one embodiment, with each tethered charging event indication or report associated with a particular location within the venue, the activity-based mapping and navigation program 110a, 110b may increase a confidence score of the particular location including a power source location.

However, if at 410, the activity-based mapping and navigation program 110a, 110b determines that the threshold number of reports have been received, then at 414, the activity-based mapping and navigation program 110a, 110b identifies the venue location (e.g., particular location in the venue) as a power source location, as described previously.

Then at 416, the identified power source location is added to a database. In one embodiment, receiving the threshold number of reports may activate the activity-based mapping and navigation program 110a, 110b to add the identified power source location to an identified power source locations library in a venue database (e.g., data lake of available power sources in the venue) for future navigational purposes, as described previously.

Then at 418, a visualization of the power source location is generated. According to one embodiment, the activity-based mapping and navigation program 110a, 110b may receive a map or floor plan of the venue and incorporate (e.g., superimpose) the identified power source locations library as a data layer on the map. In one embodiment, the activity-based mapping and navigation program 110a, 110b may receive additional venue data such as, for example, directions for traversing a floor or other area of the venue. As will be further discussed below, the activity-based mapping and navigation program 110a, 110b may employ indoor navigation capabilities to provide real-time navigation to devices needing guidance to power source locations within the venue.

Figure 5:
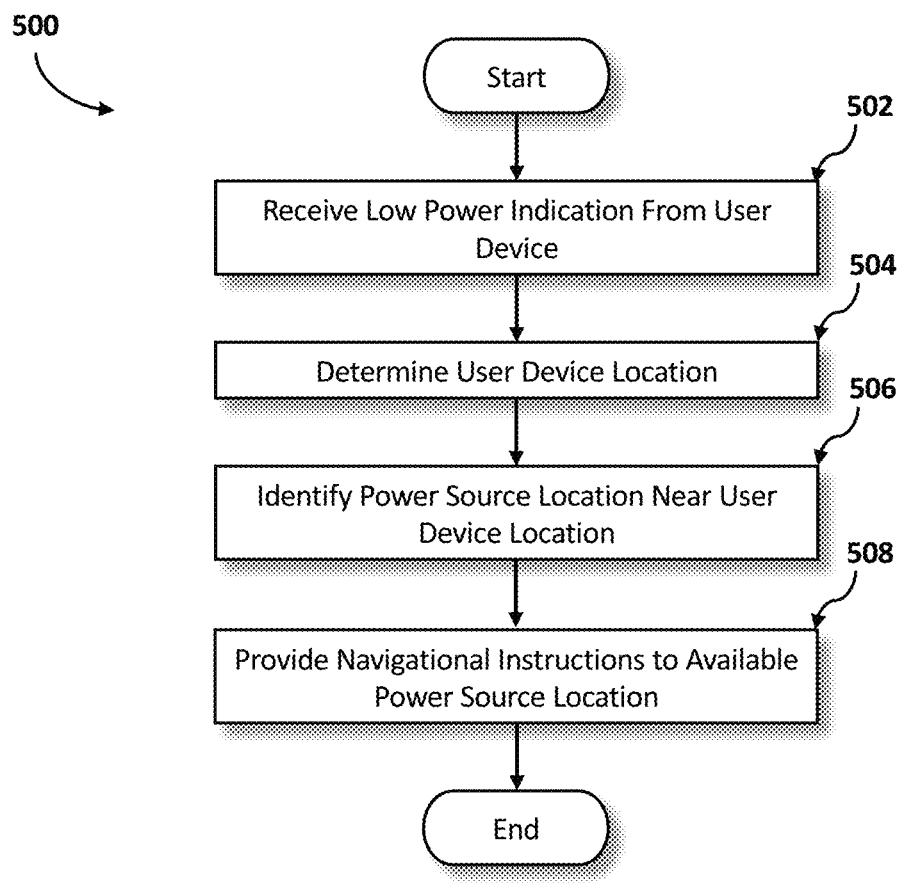
FIG. 5 is an operational flowchart illustrating a navigation process of the activity-based mapping and navigation program according to at least one embodiment.

Referring now to FIG. 5, an operational flowchart illustrating the exemplary navigation process 400 used by the activity-based mapping and navigation program 110a, 110b according to at least one embodiment is depicted.

At 502, a low power indication is received from a user device. The activity-based mapping and navigation program 110a, 110b may gain access to device data if the user opts-in to sharing the device data after entering a venue associated with the activity-based mapping and navigation program 110a, 110b, as described previously. In one embodiment, if the activity-based mapping and navigation program 110a, 110b receives a low power indication (e.g., depleting event data) from a device, the activity-based mapping and navigation program 110a, 110b may execute the navigation process to provide navigational directions to available power outlets near the device.

Then at 504, the user device location is determined. In one embodiment, the activity-based mapping and navigation program 110a, 110b may retrieve the current device location data, stored for example, in the venue database, as described previously.

Then at 506, power source locations near the user device location are identified. According to one embodiment, the activity-based mapping and navigation program 110a, 110b may trigger a power source real-time data comparison with device location data to generate navigational directions to available power outlets near the user of the device.

Then at 508, navigational instructions to available power source is provided. According to one embodiment, the activity-based mapping and navigation program 110a, 110b may render a visual representation of the power source locations on a map of the venue. In one embodiment, the visual representation may indicate availability and occupancy of the power outlets near the device of the user. In some instances, the activity-based mapping and navigation program 110a, 110b may enable the user, via the UI of the device, to select the power out for directions to the user-selected power outlet. In other instances, the activity-based mapping and navigation program 110a, 110b may communicate navigational directions to an available power outlet closest to the user. In one embodiment, the activity-based mapping and navigation program 110a, 110b may determine that the power outlets closest to the device may be occupied by other devices. If the activity-based mapping and navigation program 110a, 110b determines that the occupying devices may be fully charged, the activity-based mapping and navigation program 110a, 110b may transmit a message to those occupying devices to request the users of those devices to make the power outlets available for the device indicating low power.

After navigating the user to an available power outlet, the activity-based mapping and navigation program 110a, 110b may provide the user an option to provide feedback via the UI of the device. In one embodiment, the user may provide feedback indicating that the power source location could not be found, the power source location does not exist, and/or the power outlet is not functioning. Based on the feedback, the activity-based mapping and navigation program 110a, 110b may, in some instances, generate and transmit a service request to perform maintenance on the power outlet. In other instances, the activity-based mapping and navigation program 110a, 110b may determine that the power outlet location data may be inaccurate and may therefore mark the power source location as inactive and/or remove the power source location from the identified power source locations library.

Figure 6:
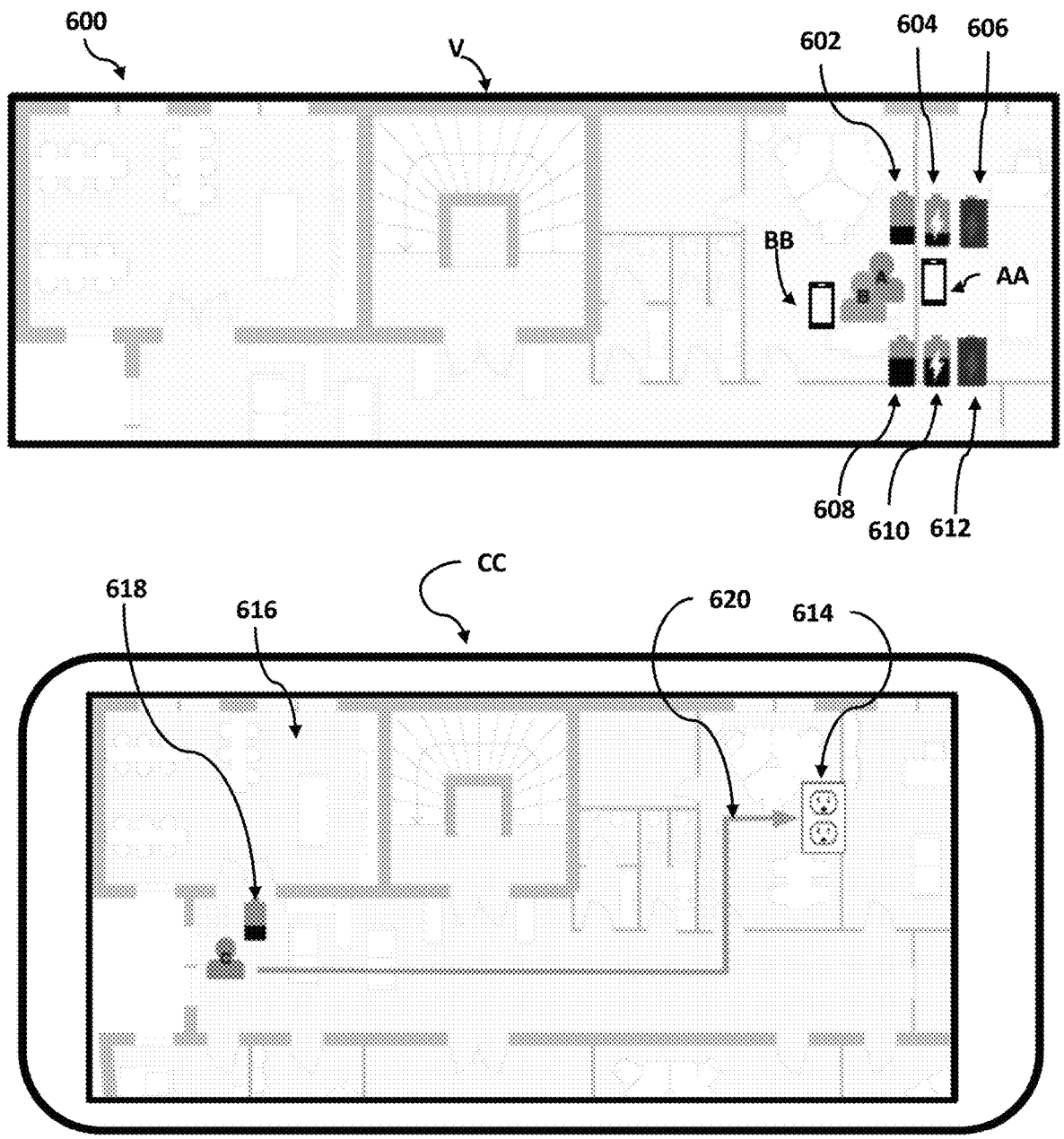
FIG. 6 is a block diagram illustrating an exemplary mapping and navigation process used by the activity-based mapping and navigation program according to at least one embodiment.

Referring now to FIG. 6, an exemplary block diagram 600 illustrating a mapping and navigation process used by the activity-based mapping and navigation program 110a, 110b, according to at least one embodiment is depicted.

Users A and B may attend a conference in a venue V. Venue V may include a venue management system (e.g., venue management system 230) running the activity-based mapping and navigation program 110a, 110b. Users A and B may include respective mobile devices AA and BB running a conference event mobile application. The conference event mobile application may interface with the activity-based mapping and navigation program 110a, 110b to provide venue and conference related data to users that opt-in. Users A and B may interact with the UI of the conference event mobile application to opt-in to share respective mobile device AA and mobile device BB data with the activity-based mapping and navigation program 110a, 110b.

The activity-based mapping and navigation program 110a, 110b may receive a low power indication or depleting event data (602) from mobile device AA associated with user A. Then, the activity-based mapping and navigation program 110a, 110b may receive movement data and charging event data from mobile device AA indicating that user A may have stopped to charge mobile device AA. Based on the movement data (e.g., stationary user A), the activity-based mapping and navigation program 110a, 110b may recognize a tethered charging event (604). Then, the activity-based mapping and navigation program 110a, 110b may receive power data from mobile device AA indicating that mobile device AA is fully charged in 15 minutes (606).

A few hours later, the activity-based mapping and navigation program 110a, 110b may receive movement data and charging event data from mobile device BB indicating that user B may have stopped to charge mobile device BB in a location similar to the charging location of mobile device AA. The activity-based mapping and navigation program 110a, 110b may determine based on power data from mobile device BB that mobile device BB may not be low on power (608), yet based on the received movement data and charging event data, the activity-based mapping and navigation program 110a, 110b may recognize a second tethered charging event (610) in the location similar to the charging location of mobile device AA. Then, the activity-based mapping and navigation program 110a, 110b may receive power data from mobile device BB indicating that mobile device BB is fully charged in five minutes (612).

The activity-based mapping and navigation program 110a, 110b may continue to gather device data (e.g., charging event data, depleting event data, movement data, power data) from additional devices until receiving the threshold number of reports indicating the tethered charging event at the charging location of mobile device AA and BB. Then, the activity-based mapping and navigation program 110a, 110b may add the location to the identified power source locations library in the venue database. Thereafter, the activity-based mapping and navigation program 110a, 110b may generate a visualization 614 of the identified power source location and add the visualization 614 to a map 616 of the venue V.

Then, user C may enter the venue V with mobile device CC and may interact with the UI of the conference event mobile application to opt-in to share mobile device CC data with the activity-based mapping and navigation program 110a, 110b. The activity-based mapping and navigation program 110a, 110b may receive a low power indication or depleting event data (618) from mobile device CC associated with user CC. Next, the activity-based mapping and navigation program 110a, 110b may determine the location data of mobile device CC in venue V and identify the power outlet that is closest to the location of user C. Thereafter, the activity-based mapping and navigation program 110a, 110b may transmit, to the mobile device CC, the map 616 superimposed with the visualization 614 of the power outlet that is closest to the location of user C. Then, the activity-based mapping and navigation program 110a, 110b may generate a navigational direction 620 for reaching the power outlet (indicated by visualization 614) from the current location of user C. Thereafter, the activity-based mapping and navigation program 110a, 110b may render the navigational direction 620 on a display of the mobile device CC.

The functionality of a computer may be improved by the activity-based mapping and navigation program 110a, 110b because the activity-based mapping and navigation program 110a, 110b may enable the computer to automatically identify and map previously unknown locations of power outlets within a venue. The activity-based mapping and navigation program 110a, 110b may also improve the functionality of the computer by automatically determining when the computer is running low on power and providing navigational directions to an available power outlet that is closest to the computer.

It may be appreciated that FIGS. 2 to 6 provide only an illustration of one embodiment and do not imply any limitations with regard to how different embodiments may be implemented. Many modifications to the depicted embodiment(s) may be made based on design and implementation requirements.

Figure 7:
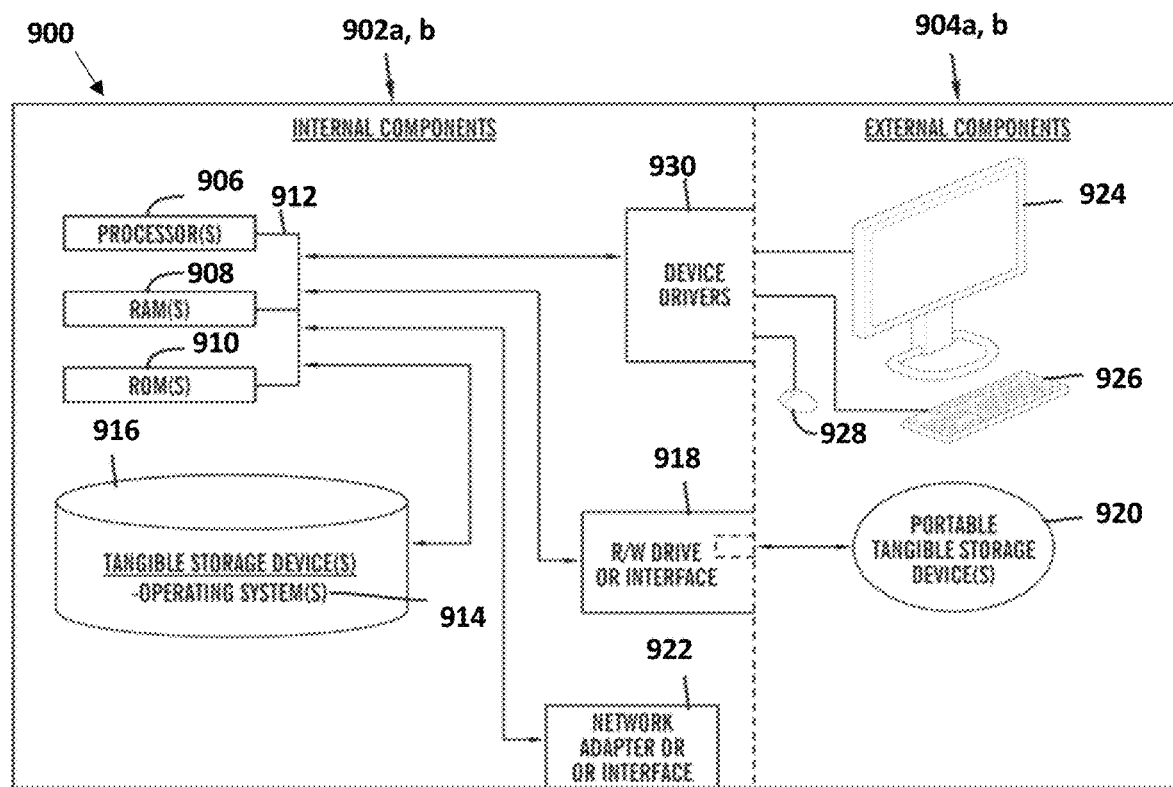
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904a, b illustrated in FIG. 7. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the activity-based mapping and navigation program 110a in client computer 102, and the activity-based mapping and navigation program 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the activity-based mapping and navigation program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the activity-based mapping and navigation program 110a in client computer 102 and the activity-based mapping and navigation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the activity-based mapping and navigation program 110a in client computer 102 and the activity-based mapping and navigation program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
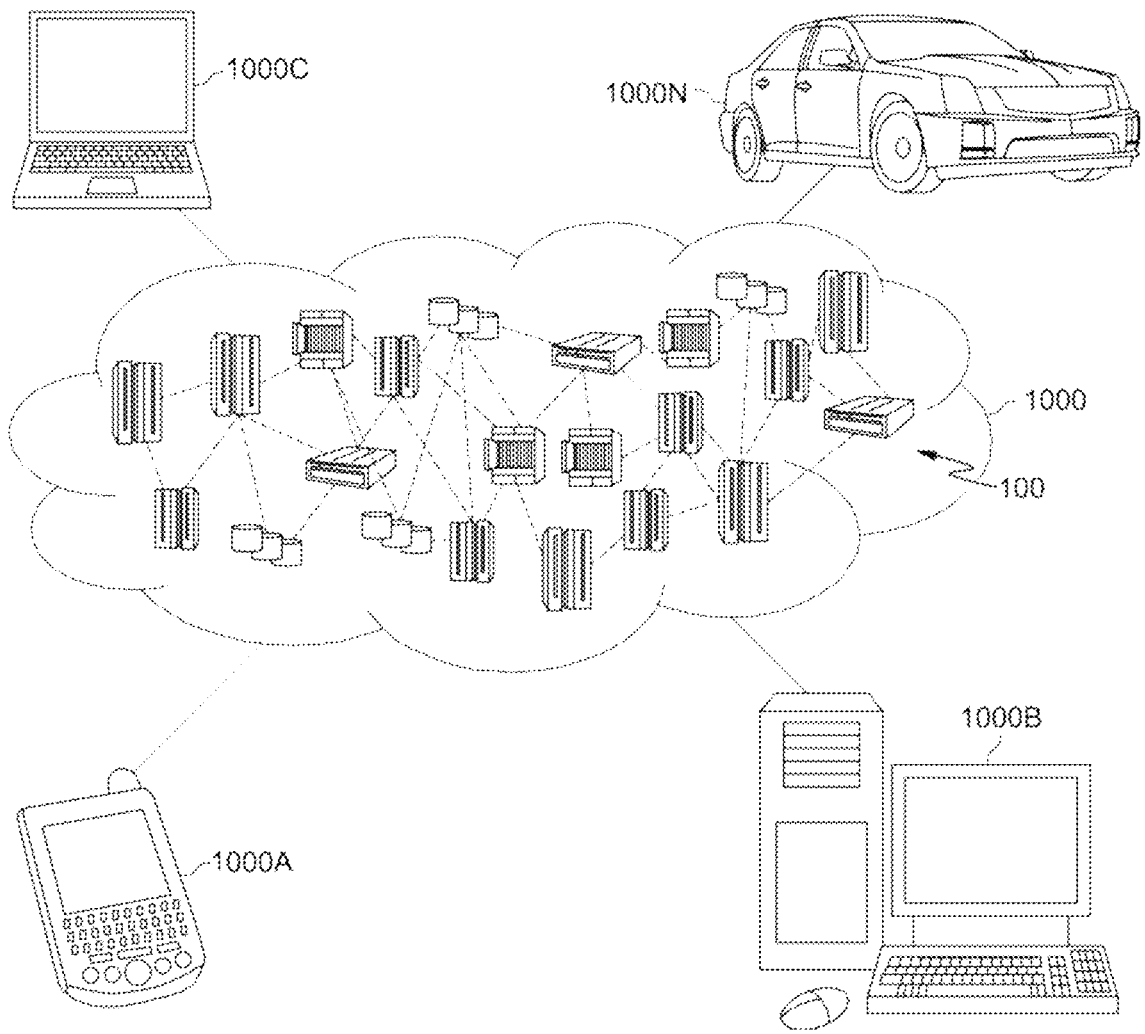
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
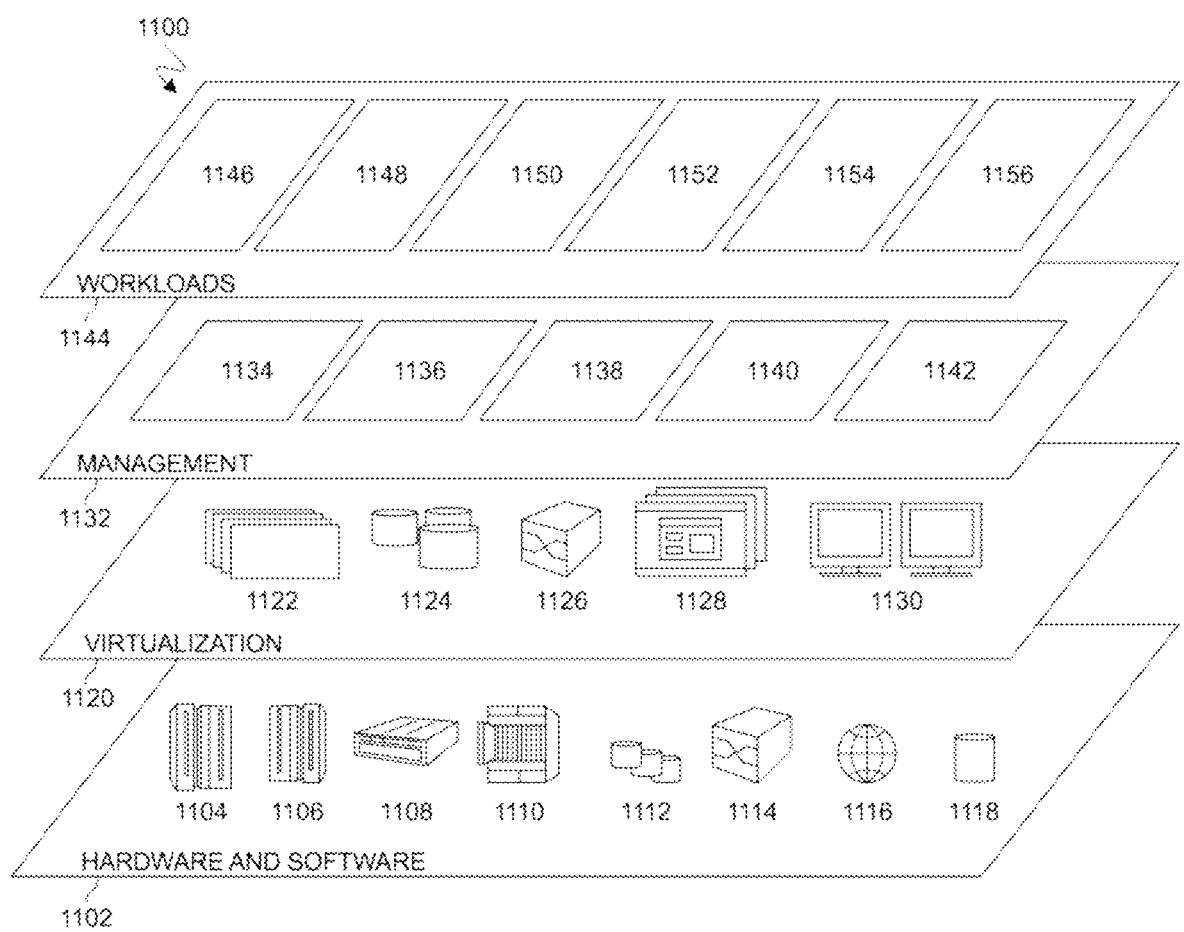
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and localization of indoor power sources 1156. An activity-based mapping and navigation program 110a, 110b provides a way to identify and map, based on user device activity, one or more unknown power source locations within a venue for indoor navigation to the identified power source locations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
    determining whether a first battery power level of a first device in a venue is actively increasing based on communicating with a first battery controller that tracks the first battery power level of the first device;
    in response to detecting that the first battery power level of the first device in the venue is actively increasing, identifying the first device as currently being charged and determining whether a movement status of
    the first device that is currently being charged indicates a minimal movement of the first device relative to a particular location of the first device in the venue, wherein the movement status is determined based on at least one movement data captured by an accelerometer of the first device;
    in response to determining that the at least one movement data indicates the minimal movement of the first device relative to the particular location of the first device in the venue, identifying a tethered device charging event of the first device in proximity of the particular location of the first device in the venue;
    in response to a number of reports of the identified tethered device charging event satisfying a threshold number of reports, predicting that the particular location includes at least one power source; and
    in response to receiving a low power indication from a second battery controller that tracks a second battery power level of a second device in the venue, navigating the second device to the at least one power source.

2. The method of claim 1, wherein the threshold number of reports comprises a single report indicating the tethered device charging event in proximity of the particular location in the venue.

3. The method of claim 1, wherein the threshold number of reports comprises a plurality of reports indicating the tethered device charging event in proximity of the particular location in the venue.

4. The method of claim 1, further comprising:
    in response to determining that the received at least one movement data includes a second movement data indicating an active movement of the first device relative to the particular location of the venue, identifying an untethered device charging event associated with the first device; and
    in response to identifying the untethered device charging event, ignoring the received charging event data.

5. The method of claim 1, further comprising:
    receiving, from the first device in the venue, an opt-in selection indicating a user of the first device granting access to at least one device data in exchange for a power source location data associated with the at least one power source in the venue.

6. The method of claim 5, wherein the at least one device data is selected from the group consisting of: a power data, the charging event data, a depleting event data, a movement data, and a location data.

7. The method of claim 1, further comprising:
    increasing a confidence level associated with the particular location including the at least one power source with each report of the tethered device charging event.

8. The method of claim 1, further comprising:
    determining an expected battery charging time for the first device at the at least one power source based on crowd sourcing the charging event data.

9. The method of claim 1, further comprising:
    storing the at least one power source to an identified power source locations library in a database associated with the venue;
    generating a visualization of the at least one power source;
    superimposing the generated visualization of the at least one power source on a map of the venue; and
    rendering the map of the venue including the superimposed visualization of the at least one power source for display in the venue.

10. A computer system for activity-based mapping and navigation, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    determining whether a first battery power level of a first device in a venue is actively increasing based on communicating with a first battery controller that tracks the first battery power level of the first device;
    in response to detecting that the first battery power level of the first device in the venue is actively increasing, identifying the first device as currently being charged and determining whether a movement status of
    the first device that is currently being charged indicates a minimal movement of the first device relative to a particular location of the first device in the venue, wherein the movement status is determined based on at least one movement data captured by an accelerometer of the first device;

in response to determining that the at least one movement data indicates the minimal movement of the first device relative to the particular location of the first device in the venue, identifying a tethered device charging event of the first device in proximity of the particular location of the first device in the venue;

in response to a number of reports of the identified tethered device charging event satisfying a threshold number of reports, predicting that the particular location includes at least one power source; and in response to receiving a low power indication from a second battery controller that tracks a second battery power level of a second device in the venue, navigating the second device to the at least one power source.

11. The computer system of claim 10, wherein the threshold number of reports comprises a single report indicating the tethered device charging event in proximity of the particular location in the venue.

12. The computer system of claim 10, wherein the threshold number of reports comprises a plurality of reports indicating the tethered device charging event in proximity of the particular location in the venue.

13. The computer system of claim 10, further comprising:
in response to determining that the received at least one movement data includes a second movement data indicating an active movement of the first device relative to the particular location of the venue, identifying an untethered device charging event associated with the first device; and
in response to identifying the untethered device charging event, ignoring the received charging event data.

14. A computer program product for activity-based mapping and navigation, the computer program product comprising:
one or more computer-readable storage media and program instructions collectively stored on the one or more computer-readable storage media, the program instructions comprising:
program instructions to determine whether a first battery power level of a first device in a venue is actively increasing based on communicating with a first battery controller that tracks the first battery power level of the first device;
program instructions to in response to detecting, that the first battery power level of the first device in the venue is actively increasing, identify the first device as currently being charged and determine whether a movement status of
the first device that is currently being charged indicates a minimal movement of the first device relative to a particular location of the first device in the venue, wherein the movement status is determined based on at least one movement data captured by an accelerometer of the first device;
program instructions to identify a tethered device charging event of the first device in proximity of the particular location of the first device in the venue in response to determining that the at least one movement data indicates the minimal movement of the first device relative to the particular location of the first device in the venue;
program instructions to predict that the particular location includes at least one power source in response to a number of reports of the identified tethered device charging event satisfying a threshold number of reports; and
program instructions to navigate the second device to the at least one power source in response to receiving a low power indication from a second battery controller that tracks a second battery power level of a second device in the venue.

15. The computer program product of claim 14, wherein the threshold number of reports comprises a single report indicating the tethered device charging event in proximity of the particular location in the venue.

16. The computer program product of claim 14, wherein the threshold number of reports comprises a plurality of reports indicating the tethered device charging event in proximity of the particular location in the venue.

* * * * *